UNITED STATES PATENT OFFICE.

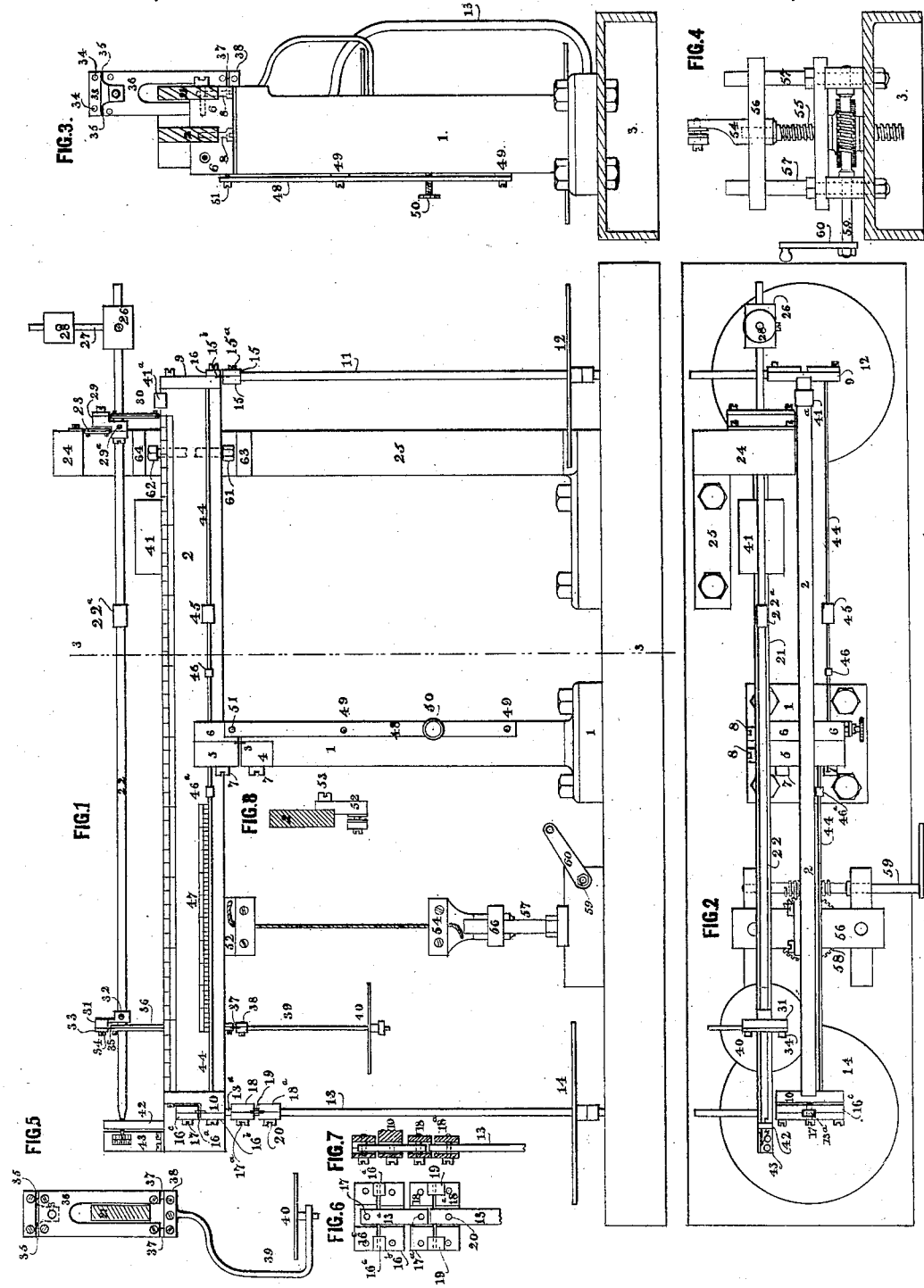

ALBERT H. EMERY, OF NEW YORK, N. Y., ASSIGNOR TO THE EMERY SCALE COMPANY, OF STAMFORD, CONNECTICUT.

BEAM-SCALE.

SPECIFICATION forming part of Letters Patent No. 278,900, dated June 5, 1883.

Application filed February 5, 1881. (No model.)

*To all whom it may concern:*

Be it known that I, ALBERT H. EMERY, of the city, county, and State of New York, have invented certain new and useful Improvements in Scales, of which the following is a specification.

My invention relates to scales in which the weights and the load to be weighed are suspended from opposite ends of a beam, whether the distances of the points of suspension on either side of the central pillar or support be equal or unequal.

My invention consists, first, in connecting the beam to the pillar or standard by one or more thin flexible metallic plates; second, in combining with the main beam from which the load and weights are suspended a secondary or indicator beam, connected with the primary beam at or near the center of motion, so as not to be affected by the bending of the main beam; third, in the combination of a main beam for sustaining the load and weights, a secondary beam connected with the first at or near the center, so as to move therewith, and an indicator-rod so connected with the secondary beam as to receive increased angular motion by the movement of the beams; fourth, in combining with a beam-scale a pair of supplemental rods supported at their respective ends by the fulcrum-blocks at the center and the platform-suspension blocks at the ends of the main beam, and carrying sliding weights for accurate balancing, or for weighing light loads, as hereinafter described; fifth, in connecting the weight and load platforms, or either of them, to the beam by suspension-rods attached by suspension-screws and flexible plates, as hereinafter described; sixth, in suspending to the beam the platforms of a beam-scale, or either of them, by thin compression-plates held by clamp-plates, as hereinafter described; seventh, in suspending the load-platform to the beam through the medium of a secondary thin plate or other joint which will permit the platform to tip without deflecting the thin plate, which is connected directly to the beam; eighth, in the combination of two load-platforms on separate beams and a weight-supporting appliance interposed between the said load-platforms by unequal leverage connections, such that, while the loads on the main platform may be equal to or greater or less than the weights which balance the same, those on the secondary platform are much less than the weights which balance them, and are small relatively to the loads on the main platform, thus adapting the scale to weigh widely-different loads with the same weight or series of weights with extraordinary delicacy and exactness; ninth, in combining with a beam-scale having a load-platform at one side of the beam-support and a weight-suspending appliance at the other side, an indicator-rod operated from the weight end of the beam and carrying a supplemental load-platform, as hereinafter described; tenth, in connecting the supplemental platform to the indicator-rod by a sliding attachment, so as to admit of changing its leverage effect on the beam; eleventh, in suspending the supplemental platform by a flexible thin plate from a point above the level of the center of motion of the beam or rod to which it is connected; twelfth, in a peculiar construction of sliding bracket for suspending the supplemental load-platform from the indicator-rod; thirteenth, in combining with a scale having thin plate-connections a variable friction-brake to regulate as required its sensitiveness or freedom of motion; fourteenth, in combining with a beam-scale a fiber-testing device, as hereinafter described.

In the accompanying drawings, Figure 1 is a front elevation of a beam-scale illustrating my invention. Fig. 2 is a plan or top view of the same. Fig. 3 is a vertical section thereof on the line 3 3, Fig. 1. Fig. 4 is an elevation of a fiber-testing device. Fig. 5 represents a section of the main beam and an elevation of the supplemental platform suspended to the secondary beam. Fig. 6 is an elevation of the attaching-plates by which the main load-platform is suspended to the beam. Fig. 7 is a section thereof. Fig. 8 represents a transverse section of the main beam and an elevation of a fiber-testing attachment hereinafter described.

1 represents a standard or pillar, and 2 a beam supported by a thin flexible fulcrum-plate, 3, the lower edge of which is clamped between a block, 4, and the upper part of the pillar 1, while the upper edge of said plate is clamped between the block 5 and a projecting lug or fulcrum-block, 6, either formed in one piece with the beam 2 or rigidly attached thereto by screws 8. Recesses or rabbets of the requisite depth to receive the edges of the plate are formed in the blocks 4 and 5 or in the block 6 and the top of the pillar 1, as preferred.

7 7 are screws by which the blocks 4 5 are clamped tightly upon the plate 3. This mode of setting the thin flexible fulcrum-plate is described and claimed in another application of even date herewith.

To the extremities of the beam 2 are fixed lugs 9 10 for the attachment of the suspension-rods 11 13, which carry the weight-platform 12 and load-platform 14. The upper end of the suspension-rod of the weight-platform 12 is pivoted by a screw, 15ᵃ, to plates or blocks 15, between which are clamped the lower edges of the thin flexible plates 15ᵇ. The upper ends of the latter are clamped by a plate, 16. The platform 12 is thus allowed to swing in either direction. The load-platform 14 is suspended from the end of the beam by flexible compression-plates 16ᵃ, clamped by plates 16ᵇ to the end of the beam, and supporting clamp-plates 16ᶜ, to which a short suspension-bar, 13ᵃ, is pivoted by a screw, 17. The lower end of the bar 13ᵃ is pivoted by screw 17ᵃ to clamp-plates 18, connected by thin flexible plates 19 with a second pair of clamp-plates, 18ᵃ, from which the main suspension-bar 13 of the platform is hung by a screw, 20. This manner of making the suspension-bar in two sections, 13 13ᵃ, with a flexible connection between them, will be seen to permit the platform 14 to tip under an unequal load, so as to cause the load to hang with the center of gravity always directly beneath the plates 16ᵃ without any deflection of the said plates, which might impair the delicacy and precision of weighing.

21 represents a secondary beam, rigidly attached at its center to the fulcrum-block 6, so as to move in unison with the main beam 2 without being affected by the bending of the latter under a load. The beam 21 may carry an adjustable tare-weight, 41, for balancing the scale and counterbalancing a scoop or other vessel placed on the platform 14 to contain any article to be weighed.

41ᵃ represents a small weight for use for fractional weighing, in connection with the graduations shown at the upper edge of the beam 2 in Fig. 1.

22 represents a light beam or rod suspended by means of a thin plate-connection, 23, to a lug, 24, projecting from the top of a pillar or standard, 25. The rod 22 carries an adjustable counterbalance-weight, 26, from which projects upward a stud, 27, carrying a weight, 28, which is set up or down to vary the effect it will produce under a deflection of the rod 22. The rod 22 is adjustable lengthwise in the bracket 29, to which its suspension-plates 23 are attached, and is secured by a set-screw, 29ᵃ. Said bracket holds, also, thin plates 30, which connect the said rod 22, at a short distance from its fulcrum, with the end of the beam 21 which corresponds with the weight end of the beam 2, so that a depression of the weight end of the beam 2 will elevate the free end of the rod 22 to an extent as much greater as the distance from the fulcrum-plate 23 to the end of the rod 22 is greater than the distance between the fulcrum-plates 23 and 30. The indicator-rod carries a sliding tare or balancing weight, 22ᵃ.

31 represents a bracket fitted to slide on the indicator-rod 22, and secured in any position to which it may be adjusted by a set-screw, 32. The bracket 31 projects upward and horizontally, as clearly shown in Fig. 1, and receives at its upper part a clamp-plate, 33, secured by screws 34, and serving to fix the upper ends of thin flexible plates 35 35, which are held at their lower ends between clamp-plates 36, having the form of an inverted U, extending down on each side of the beam 21 and clamping between their lower extremities thin plates 37, which are also clamped between plates 38, to which the suspension-rod 39 of the small load-platform 40 is hung. A slotted guide, 42, projects upward from the beam 21, so as to embrace the indicator-rod 22 near its extremity without contact, the said rod being notched or recessed, as shown in Fig. 2, so that the parts will be retained in their proper relative positions, while the rod is allowed free vertical motion within proper limits.

43 is an indicator-plate projecting upward from the end of the beam in proximity to the end of the rod 22, and graduated, as shown in Fig. 1, to show the degree of deflection of the rod.

44 44 are longitudinal rods, fixed at their respective ends in the central fulcrum-blocks, 5 and 6, and the platform suspension-blocks 9 10 at the extremities of the beam. On the rods 44 are sliding weights 45 46 46ᵃ for the delicate balancing of the scale. The small weights 46 46ᵃ are preferably made of aluminium or other light material for very accurate adjustment. Graduations may be provided, as shown at 47, to enable the use of the light weights 46ᵃ for very delicate and accurate weighing of loads, either on the supplemental platform 40 or the main platform 14.

The play of the beam is limited by the contact of set-screws 61 62 on the beam 21 with shoulders 63 64 on the pillar 25.

As this scale is frictionless, it is extremely sensitive. To adapt it for more convenient use in cases where extreme sensitiveness is unnecessary or undesirable, and to cause it to come more promptly to rest, a friction-brake is provided, consisting of an elastic bar, 48, screwed to the pillar 1 at 49 49, and provided between these points of attachment with a set-screw, 50, by which the pressure of the screw or stud 51 against the fulcrum-block 6 of the beam is regulated as required. In the illustration here given the weight and load platforms are shown as suspended at equal distances from the supporting-fulcrum of the beam. This is not essential to the invention.

The weight-platform may, if preferred, be suspended at a less distance from the fulcrum, so that a smaller weight can be used to indicate a given load, or vice versa. In practice it is proposed to suspend the two platforms at such relative distances that by transposing the weight and the load the weight may be increased in value tenfold.

The scale is adapted for use in testing the tensile strengths of threads or fibers, as shown in Fig. 1, by providing a clamp or holder, 52, fastened by a screw, 53, to the beam, and a drawing-clamp, 54, below, attached to a screw-stem, 55, guided by a cross-head, 56, and studs 57, and drawn down by a worm-wheel, 58, and endless screw 59, operated by a crank, 60, as shown more particularly in Fig. 4. By this means the draft on the thread can be gradually increased, so as to maintain the beam in its central position, as indicated by the rod 22, while weights are added to the platform until the maximum strain is reached.

The advantages in the use of thin-plate fulcrums in fiber-testing are several, among which may be mentioned that they are frictionless, of great delicacy of action, and obviate all liability to derangement of the parts by the shock produced by the breaking of a specimen.

By suspending the small platform 40 from a point above the center of motion of its rod or beam 22 it is caused to exert an increasing leverage as the rod descends and a decreasing leverage as it ascends. This increases the sensitiveness of the scale to any desirable extent, which may be modified by the vertical adjustment of the weight 28.

The novel mode of suspending a weight or load platform to the beam is not limited to the specific construction of attaching-clamp herein described. The thin plate may be soldered or otherwise permanently attached either directly to the beam or to the suspension-rod, or both, or to a plate or plates to be attached to either, and pins may be substituted for screws.

Whatever novel subject-matter I have set forth and not claimed or attempted to claim herein I have claimed or attempted to claim in other applications or have reserved to be claimed in future original applications.

The following is claimed as new:

1. In a beam-scale, a beam firmly fixed in position at its bearing-fulcrum by one or more thin flexible plates, and firmly connected to its load and weight platform suspension-rods by thin plates, substantially as and for the purposes set forth.

2. The combination of a main beam and an indicator-beam, suitably connected at or near the supporting-fulcrum, and independent at the ends to relieve the indicator-beam from the effect of the bending of the main beam by the weight or load.

3. The combination of the main beam 2, the secondary beam 21, and the indicator-rod 22, as herein set forth, the main beam carrying the load or weight, and the secondary beam connecting with the indicator, for the purposes explained.

4. The combination of the beam 2, the supporting lugs or pieces 5 6, the two weight-rods 44, and the two suspension-blocks 9, 10, as and for the purposes set forth.

5. The suspension rod or rods for a weight or load platform, firmly connected to the scale-beam by one or more thin flexible plates suitably attached, substantially as set forth.

6. The suspension rod or rods for a weight or load platform, connected to the scale-beam by means of a suspension screw or pin, thin flexible plate or plates, and clamp-plates, substantially as set forth.

7. In a balanced scale, the combination, with the beam 2, of the suspension-rod 13$^a$, thin compression-plates 16$^a$, and attaching clamp-plates 16$^b$ 16$^c$, as and for the purposes set forth.

8. The bar 13$^a$, connected by thin flexible plates to the beam and by flexible plates 19 and screw or pin 20 to the suspension-bar of the platform 14, as and for the purposes set forth.

9. The combination of the two load-platforms 14 and 40 with the two beams 2 and 22, arranged with suitable weight-connections, substantially as set forth.

10. The combination, with a main beam or beams, of a load-platform at one side of the fulcrum, a weight rod or rods at the other side of the fulcrum, an indicator-rod connected with the weight end of the main beam or beams, and a platform suspended from said indicator-rod, substantially as set forth.

11. In combination with the main beam 2, the sliding connection 31, adjustably suspending the load-platform 40, and the rod or beam 22, substantially as set forth.

12. A platform suspended from a scale-beam or indicator-rod by a thin-plate connection at a point above the center of motion of said beam or rod, to increase the sensitiveness of the scale.

13. The combination, with the indicator-rod, of the bracket 31, projecting above said rod, to afford an elevated point of suspension for the swinging platform 40, as and for the purposes explained.

14. A friction-brake, operating substantially as herein set forth, in a scale constructed with flexible plate-connections.

15. The combination, with a beam-scale having thin-plate-fulcrum connections, of the fiber-testing devices, constructed and applied as herein set forth.

ALBERT H. EMERY.

Witnesses:
OCTAVIUS KNIGHT,
MAHLON RANDOLPH.